(12) United States Patent
Ramseyer et al.

(10) Patent No.: US 9,568,346 B2
(45) Date of Patent: Feb. 14, 2017

(54) MAGNETIC-INDUCTION FLOW METER, PARTICULARLY FOR HIGH PRESSURE APPLICATIONS

(71) Applicant: Endress + Hauser Flowtec AG, Reinach (CH)

(72) Inventors: Severin Ramseyer, Munchenstein (CH); Matthias Achermann, Reinach (CH); Hans-Ruedi Zimmermann, Therwil (CH)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 14/784,650

(22) PCT Filed: Mar. 26, 2014

(86) PCT No.: PCT/EP2014/056033
§ 371 (c)(1),
(2) Date: Oct. 15, 2015

(87) PCT Pub. No.: WO2014/170104
PCT Pub. Date: Oct. 23, 2014

(65) Prior Publication Data
US 2016/0069717 A1    Mar. 10, 2016

(30) Foreign Application Priority Data

Apr. 19, 2013    (DE) .......................... 10 2013 103 970

(51) Int. Cl.
*G01F 1/58* (2006.01)

(52) U.S. Cl.
CPC ..................... *G01F 1/584* (2013.01)

(58) Field of Classification Search
CPC ...................................... G01F 1/58; G01F 1/32
(Continued)

(56) References Cited

U.S. PATENT DOCUMENTS

| 3,397,575 A | 8/1968 | Ham |
| 4,279,166 A | 7/1981 | Gryn et al. |

(Continued)

FOREIGN PATENT DOCUMENTS

| DE | 1200558 | 9/1965 |
| DE | 2432573 | 1/1976 |

(Continued)

OTHER PUBLICATIONS

English Translation of International Preliminary Report on Patentability, WIPO, Geneva, Oct. 29, 2015.

(Continued)

*Primary Examiner* — Jewel V Thompson
(74) *Attorney, Agent, or Firm* — Bacon & Thomas, PLLC

(57) ABSTRACT

An assembly procedure for an electrode anchor, and a magnetic-induction flow meter, particularly for high pressure applications with medium pressures above 5.1 MPa (51 bar), having a measuring tube on which a multi-part electrode anchor for securing a measuring electrode is arranged. Included are: a) a coupling fitting, which is materially bonded to the measuring tube wherein the coupling fitting comprises a groove, or forms a groove together with the measuring tube; and b) a coupling insert for guiding and/or securing the measuring electrode the coupling insert being connected to the coupling fitting by way of a coupling. The coupling insert comprises anchoring wings which engage in the groove by a partial rotation and thereby effect the coupling.

14 Claims, 3 Drawing Sheets

(58) Field of Classification Search
USPC .......................... 73/861.12, 861.22, 861.24
See application file for complete search history.

(56) References Cited

U.S. PATENT DOCUMENTS

| | | | |
|---|---|---|---|
| 4,358,964 A | | 11/1982 | Otsuka |
| 4,773,275 A | * | 9/1988 | Kalinoski ............... G01F 1/584 204/400 |
| 4,899,593 A | * | 2/1990 | Inami ..................... G01F 1/588 73/861.12 |
| 5,224,394 A | | 7/1993 | Kalinoski |
| 5,925,830 A | * | 7/1999 | Schalk .................... G01F 1/584 73/861.08 |
| 5,955,681 A | * | 9/1999 | Hafner .................... G01F 1/584 73/861.17 |
| 6,257,071 B1 | * | 7/2001 | Dessert ................. G01F 1/3254 73/861.22 |
| 8,915,146 B2 | * | 12/2014 | Kerrom ................... G01F 1/584 73/861.12 |
| 2004/0149046 A1 | | 8/2004 | Yamazaki |
| 2010/0024568 A1 | | 2/2010 | Diederichs |

FOREIGN PATENT DOCUMENTS

| | | |
|---|---|---|
| DE | 3024767 | 1/1981 |
| DE | 3704464 A1 | 8/1988 |
| EP | 0608793 A2 | 8/1994 |
| EP | 2017585 A1 | 1/2009 |
| GB | 1153295 | 5/1969 |
| JP | H08271302 | 10/1996 |

OTHER PUBLICATIONS

International Search Report,, EPO, The Netherlands, Jun. 27, 2014.
German Search Report, German PTO, Munich, Dec. 12, 2013.

* cited by examiner

MAGNETIC-INDUCTION FLOW METER, PARTICULARLY FOR HIGH PRESSURE APPLICATIONS

TECHNICAL FIELD

This invention concerns a magnetic-induction flow meter, as well as an assembly procedure of an electrode anchor.

BACKGROUND DISCUSSION

Magnetic-induction flow meters are used in many different fields of application. The problem of the anchoring of the measuring electrodes protruding into the measuring tube occurs especially in the area of high pressure applications.

In the past, several anchoring concepts have been described, which, however, for various reasons did not constitute any satisfactory solution.

German patent DE 10 2007 004 827 A1 discloses a yoke assembly in one embodiment. Such a construction does, however, lead to excessive dimensions of the casing. U.S. Pat. No. 7,938,020, US Patent Publication 2004 014 90 46 and U.S. Pat. No. 3,924,466 each disclose screw connections or screw inserts to anchor the measuring electrode. Such screw connections might however lead to problems with tightness. U.S. Pat. No. 4,388,834 discloses a so-called mushroom-head electrode whose connection to the measuring tube is based on its mushroom-head geometry. U.S. Pat. No. 4,567,775 discloses a full grouting version used to anchor the measuring electrode.

SUMMARY OF THE INVENTION

Based on this state of the art, it is therefore the purpose of this invention to provide a magnetic-induction flow meter with an electrode anchor with high pressure stability and low construction height as well as a procedure for the construction of such an electrode anchor as well as a tool designed for this purpose.

According to the invention, a magnetic-induction flow meter that is particularly suitable for high pressure applications has a measuring tube with a multi-part electrode anchor to attach a measuring electrode, with the electrode anchor consisting of the following components:
  a) a coupling fitting that is connected in same-substance manner with the measuring tube, with the coupling fitting having a groove or forming a groove together with the measuring tube; and
  b) a coupling insert for guiding and/or fixing a measuring electrode that is connected with the coupling fitting via a coupling, with the coupling insert having anchoring wings that engage in the groove by a partial rotation and thus effect the coupling.

The coupling fitting may hence either already have a groove or form one in interaction with the measuring tube. The anchoring wings engage in that groove. Fastening and loosening is effected by a partial rotation, e.g. by 90°, as in a bayonet catch.

This electrode anchor is suitable for securely attaching electrodes on the tube even at high medium pressures, e.g. at medium pressures over 5 MPa (50 bar).

Advantageous embodiments of the invention are the subject matter of the subclaims.

It is advantageous if the coupling insert has a recess parallel to the measuring electrode axis, in which the measuring electrode and/or a measuring electrode attachment connected to it is arranged. This recess allows the measuring electrode to be guided within the coupling insert.

It is an advantage if the measuring electrode or the measuring electrode attachment connected with the measuring electrode is fixed against the coupling insert in a tight fit. The tight fit allows a firm hold of the measuring electrode at least on one side, with the measuring electrode—as, for example, shown in FIG. 2—being pressed against the sealing surface of a sealing insert.

It is advantageous if the external diameter of the measuring tube has a flat surface in the area of the electrode anchor. This allows for a large connecting surface between the measuring tube and the coupling fitting and thus high tear resistance.

The anchoring wing and the coupling fitting advantageously have surfaces that are placed over each other, so-called coupling surfaces, which have an inclination angle with regard to the flat surface of the external diameter of the measuring tube to set the rotation direction for the coupling of both, the coupling fitting with the coupling insert. This intuitively specifies the rotation direction during assembly, as an end stop is provided in the contrary rotation direction.

The coupling fitting is advantageously welded to the measuring tube and preferably fastened with circumferential welding seams. This allows for a same-substance fit. The coupling fitting and, if required, also the coupling insert are made of metal, just like the measuring tube, especially of steel.

The partial rotation for the coupling is advantageously done at an angle of 45-135°, preferably 60-120°, and especially 80-100°. The same applies for loosening the coupling.

The coupling advantageously is effected as a form-fitted coupling.

The coupling fitting may advantageously be designed as two L-shaped retaining brackets which require only very little space and reach behind the anchoring wings of the coupling insert.

It is advantageous if the recess in the coupling insert running parallel to the measuring electrode axis has a damping sleeve to limit the free movement of the measuring electrode and/or the measuring electrode attachment inside the recess and/or to electrically insulate the measuring electrode with regard to the coupling insert.

The measuring electrode may in some sections be surrounded by an insert made of a pressure-tight material arranged in a borehole in the measuring tube along the entire length of the borehole and having a sealing surface at the end, preferably in the form of a projection, on which the measuring electrode attachment is placed. This arrangement provides additionally improved pressure tightness.

It is advantageous if the sealing surface has an outwards material curvature when viewed from the radial direction.

The measuring tube may advantageously be coated on the inside at least in some sections with an electrically-insulating material layer, with the measuring electrode punctuating this material layer and the material layer having a material curvature in the direction of the measuring tube axis in the area of the measuring electrode.

According to the invention, an assembly process for an electrode anchor for a measuring electrode on a measuring tube of a magnetic-induction flow meter comprises the following steps:
  a) If necessary, attachment of flat surfaces on the external diameter on the measuring tube of the magnetic-induction flow meter;

b) Fixing of a coupling fitting on the external diameter of the measuring tube, preferably while forming a groove together with the measuring tube;
c) Insertion of a coupling insert into the coupling fitting orthogonally to the measuring tube.
d) Rotating movement of the coupling insert, with the anchoring wings arranged on the coupling insert engaging in the groove or a groove arranged in the coupling fitting and wherein during the rotating movement a measuring electrode attachment partly arranged in the coupling insert, or a measuring electrode, is pressed against the coupling insert in a tight fit.

The assembly of the electrode anchor may be effected simply by a socket wrench not explained in detail.

BRIEF DESCRIPTION OF THE DRAWINGS

The invention is described in more detail using the included illustrations on the basis of several exemplary embodiments. They show.

DETAILED DISCUSSION IN CONJUNCTION WITH THE DRAWINGS

The structure and measuring principle of a magnetic-induction flow meter is basically known. According to Faraday's induction law, a voltage is induced in a conductor that moves inside a magnetic field. For the magnetic-inductive measuring principle, the flowing measuring substance corresponds to the moving conductor. A magnetic field with constant strength is generated by two field coils on two sides of a measuring tube. On the internal wall of the measuring tube, there are two measuring electrodes orthogonally to the former. When the measuring substance flows through the tube, they tap the voltage that is generated. The voltage induced is in a proportional relation to the flow velocity and thus to the volume flow rate. The magnetic field generated by the field coils is generated by a pulsed direct current with alternating polarity. This guarantees a stable zero point and renders the measuring resistant against influences from multiple phase substances, inhomogeneities in the liquid or low conductivity. Magnetic-induction flow meters with coil arrangement comprising more than two field coils and a different geometric arrangement are known.

High-pressure applications of magnetic-induction flow meters pose new challenges for the known electrode constructions. A high pressure acts on the measuring electrodes that protrude directly into the measuring tube. Consequently, the measuring electrodes must be anchored in a particularly tear-proof manner. Pressure tightness is another important aspect in the development of an electrode anchor suitable for high pressures. A further aspect is the compact construction of the electrode anchor, as there is only limited space in many applications for a magnetic-induction flow meter. Larger casing structures and electrode anchors are therefore a disadvantage. A special focus is on the installation height of the electrode anchor, i.e. the distance the electrode anchor protrudes from the measuring tube.

Figure 1:
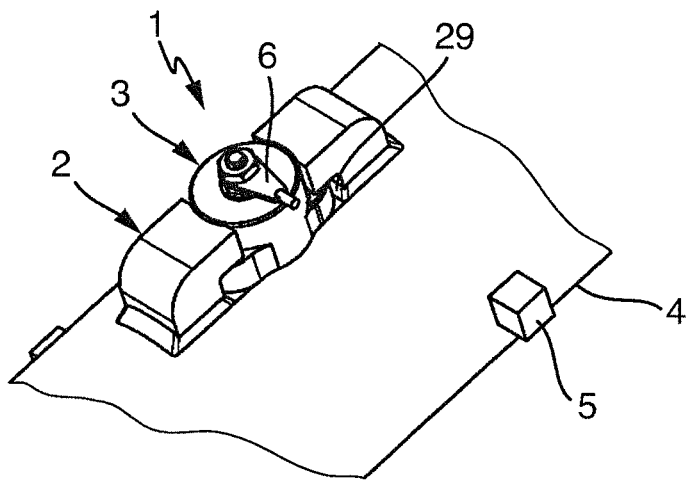
FIG. 1 is a schematic view of an electrode anchor on the measuring tube of a magnetic-induction flow meter according to the invention.

FIG. 1 shows an electrode anchor 1 for a measuring electrode 7 of a magnetic-induction flow meter with a measuring tube 4. The electrode anchor 1 comprises a coupling fitting 2 in the form of two opposite retaining brackets attached to the external diameter of the measuring tube 4. The coupling fitting 2 is attached to the measuring tube 4 in a same-material manner, preferably by welding. This means that no interference has to occur on the measuring tube 4, which would lead to pressure instability and problems with tightness in high pressure applications.

The coupling fitting shown in the form of a retaining bracket should only be understood as a preferred exemplary embodiment of the electrode anchor according to the invention since this version is particularly space-saving. The coupling fitting 2 may also be executed as a retaining plate if the respective openings for the reception of a coupling insert 3 are provided as well as anchoring surfaces which allow for a fixing of the coupling insert 3 on or in the support 2 when the former is rotated.

Figure 4B:
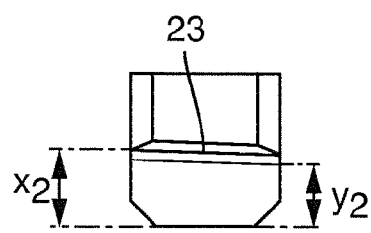
FIG. 4a-FIG. 4c are various views of a coupling fitting as part of the electrode anchor.
Figure 4C:
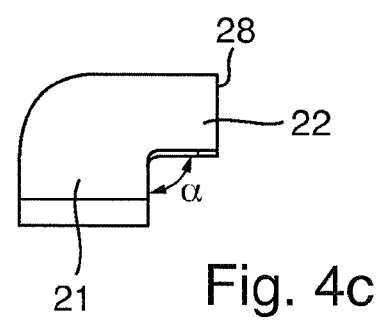
Figure 4A:
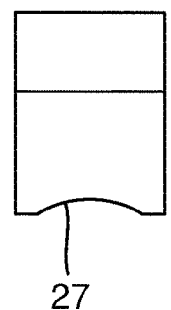

The coupling fitting is shown in detail in FIGS. 4a-4c. It has an anchoring segment 21 that is attached on one side at the termination to the measuring tube 4 by welded connection and radially protrudes from the external diameter of the measuring tube 4. The anchoring segment changes into a coupling segment 22 in a 90° curve (a). This coupling segment 22 mainly runs parallel to the measuring tube axis. FIG. 1 allows the viewer to see that the two coupling segments 22 of the retaining brackets of the coupling fitting 2 are opposite one another and/or each arranged towards each other. In this, every coupling segment has an end surface 28 on the front that is each arranged in a plane orthogonal to the measuring tube axis.

The anchoring segment 21 has an average dimension (width*length) of at least 10*10 mm, preferably more than 12*12 mm. The anchoring segment 21, incl. the curve, and hence also the coupling fitting, thus protrudes preferably a maximum distance of 25 mm, especially a maximum distance of 20 mm, from the measuring tube 4. This allows for a compact construction of the magnetic-induction flow meter.

The coupling segment 22 preferably has an average dimension (width*height) of 10*5 mm. The length of the coupling segment, including the curve, is preferably 12-30 mm.

The coupling segment 22 has a coupling area and/or coupling surface 23 that is opposite the external diameter of the measuring tube 4. This coupling surface 23 is tilted in such a way that the lateral distance $x_2$ of the first lateral edge of the coupling area 23 to the external diameter of the measuring tube 4 is larger than the lateral distance $y_2$ of the second lateral edge of the coupling area 23 to the external diameter of the measuring tube 4. The coupling insert 3—especially its anchoring wing 19—engages in the groove between the coupling area 23 and the external diameter of the measuring tube 4. This engagement is effected by a bayonet-like rotating movement. The tilt in the coupling area 23 demands a certain rotational direction in which the coupling insert 3 has to be turned to engage in the coupling fitting 2. Said groove has a height measured from the external diameter of the measuring tube of preferably 30-70% of the total height, especially 35-65% of the total height of the coupling fitting 2.

The coupling segment 22 has a terminal recess 27 in the shape of a circular arc that imitates a part of the external shape of the coupling insert 3. This prevents any slipping of the coupling insert 3, and guarantees that the rotational movement is guided when the coupling insert 3 is connected with the coupling fitting 2.

The embodiment of the coupling fitting 2 shown in FIGS. 4a-4c has been subjected to a tear test to prove the stability of the connection with the measuring tube 4. The coupling fitting 2 was subjected to the maximum load of the measuring device that was available, i.e. to 2 megagrams (2 tonnes). No tear was detected in this measuring range.

FIG. 1 further shows the coupling insert 3 that is connected with the coupling fitting 2 in the former's anchoring position. The coupling insert 3 shows a cylindrical core body 20. In a lower part segment of the core body 20, anchoring wings 19 are formed that protrude radially, preferably at least 1 mm, especially preferred at least 2 mm, from the shell surface of the core body. One anchoring wing in this shows a coupling area and/or coupling surface 18 which has an inclination angle with regard to a [translator's note: word missing in source] parallel to the circular surface of the core body 20. This inclination angle is preferably 1-10°. It corresponds to the inclination angle of the coupling surface 23 of the coupling fitting 2.

The coupling insert 3 and coupling fitting 2 are each made of metal, preferably of stainless steel.

The coupling insert 3 has a cylindrical recess 14 that is rotation-symmetric and expands to the measuring tube wall and runs parallel to the measuring electrode axis of the pin-shaped measuring electrode 7. This recess contains a damping sleeve 13 of insulating material that shields the measuring electrode 7 and the measuring electrode attachment 8 connected to it electrically against the metallic components—especially against the coupling insert. At the same time, the damping sleeve softens the axial movement of the measuring electrode attachment 8 and the measuring electrode 7 in the rotation-symmetric cylindrical recess in the coupling insert 3. The measuring electrode attachment 3 has a thread in one end area that connects with a fastening nut 16 for the axial attachment of the measuring electrode attachment 8. A counter-nut 17 is also connected with the same thread. An electrode terminal is arranged between the fastening nut 16 and the counter-nut 17.

In FIG. 1, other components of the magnetic-induction flow meter that are basically known have not been illustrated for simplicity's sake. This regards, for example, a magnetic system, an evaluation unit, a casing etc. There is only a schematic indication of the fastening segments 5 for a magnetic system.

Figure 2:
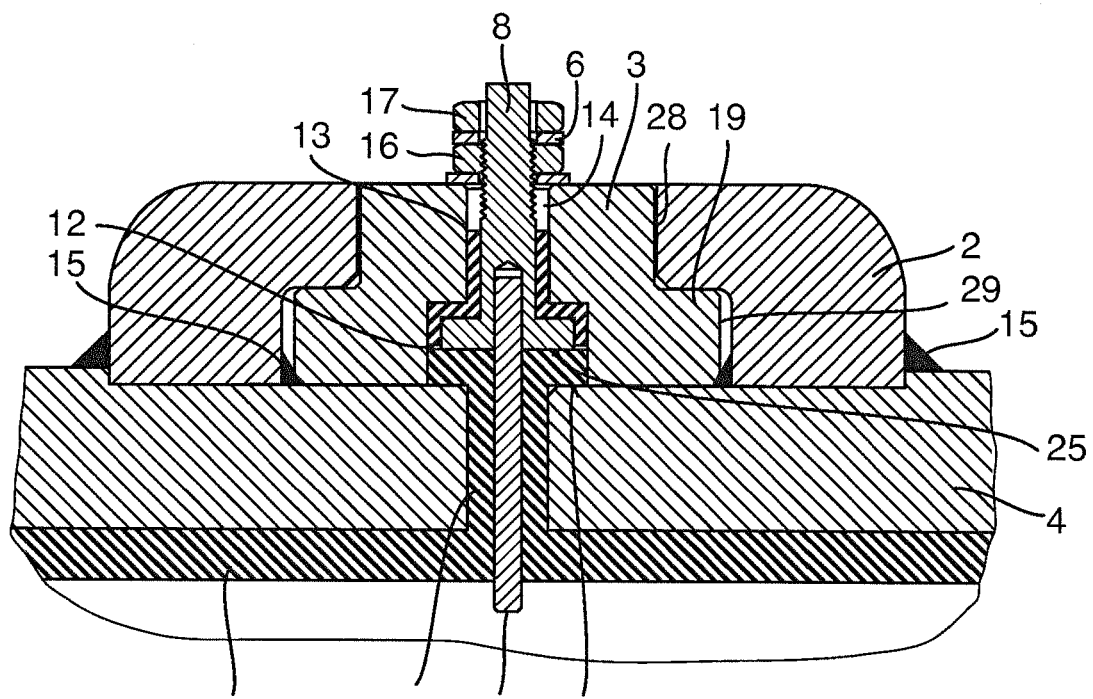
FIG. 2 is a sectional view of the electrode anchor.
Figure 3A:
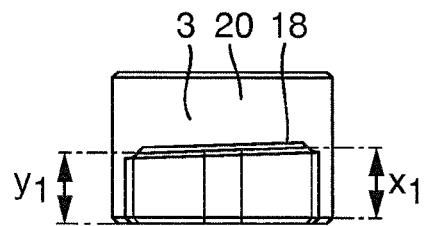
FIG. 3a-FIG. 3c are various views of a coupling insert as part of the electrode anchor.
Figure 3B:
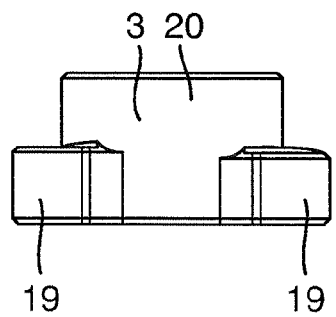
Figure 3C:
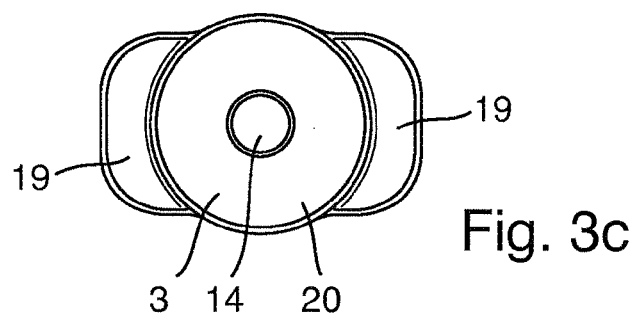

FIG. 2 shows the details of the arrangement of the electrode anchor 1. One can see that the external diameter of the measuring tube has a flat surface at the point where the electrode anchor is placed, in order to allow better positioning of the coupling fitting on the measuring tube. The coupling fitting is attached to the measuring tube 4 by means of one or several preferably circumferential welding connections 15. The measuring tube has an insert 10 with a projection 11 which rests on the external diameter of the measuring tube. The side of the insert 10 feeds into a liner 9 attached to the inside of the measuring tube 4 on the side opposite the projection. The insert 10 and the liner 9 are each made of an electrically insulating material. Rubber is particularly suited due to its additional sealing characteristics under high pressure. The insert and the liner may be connected by vulcanization.

The measuring electrode 7 may be pushed into the insert 10, or be connected permanently by gluing, vulcanization or overmolding.

The projection 11 on the insert has a frontal sealing surface 12 on which the electrode anchor rests. For this purpose, the sealing surface may have groove-shaped sealing grooves 26 on the front sealing surface.

Figure 5:
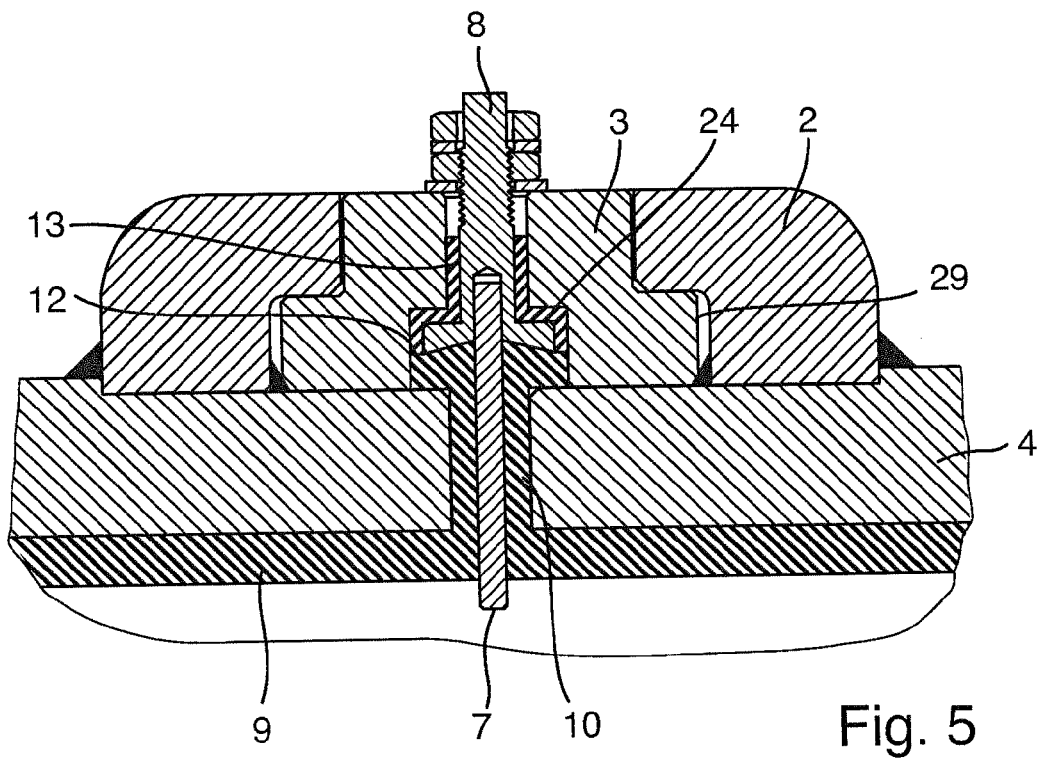
FIG. 5 is a sectional view of a second modified electrode anchor.
Figure 6:
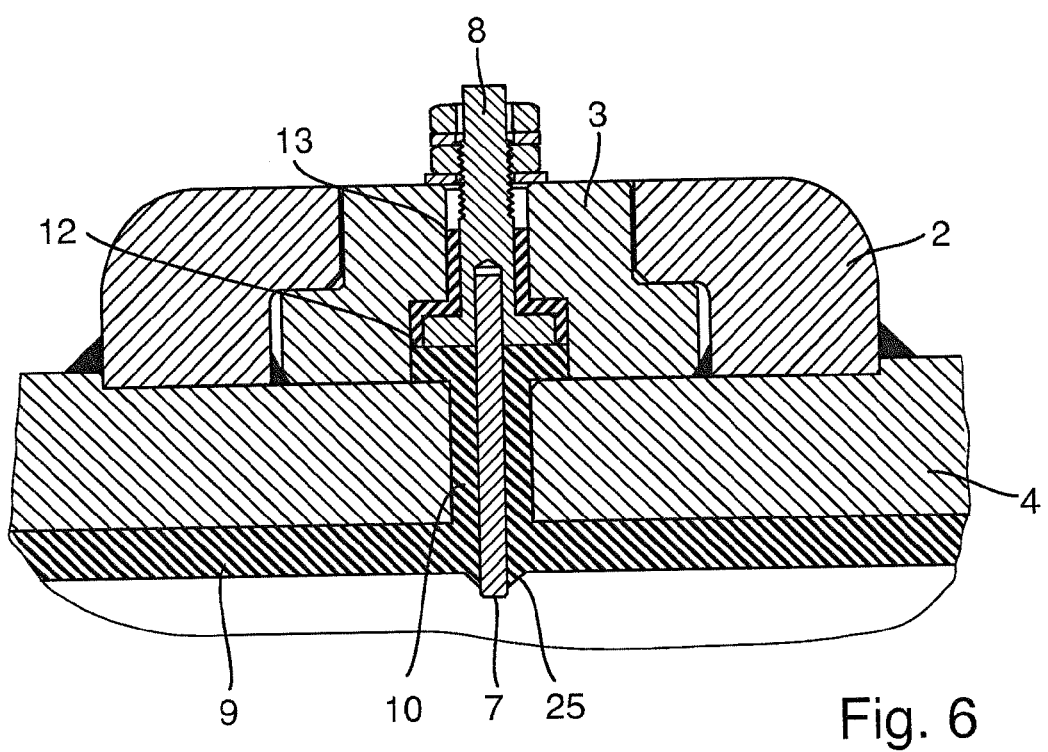
FIG. 6 is a sectional view of a third modified electrode anchor.

FIG. 5 shows another embodiment of the electrode anchor according to the invention, wherein the frontal sealing surface 12 of the insert 10 has a material outward curvature 24. This sealing surface provides additional sealing at higher pressures.

Alternatively or in addition, the liner may also feature a material curvature directed towards the measuring tube axis that creates additional tightness for high medium pressures.

Basically, the coupling between the coupling fitting 2 and the coupling insert 3 provides a significantly better and especially more pressure-stable support due to the engagement of the anchoring wings 19 in the groove between the coupling segment 22 and the measuring tube compared to screw connections. In addition, the measuring electrode may be quickly and intuitively attached or detached, as required, by the 90° rotating movement.

The electrode anchor 1 shown in FIG. 1-6 is compelling due to its low installation height (less than 25 mm)—which makes for a very compact casing dimension for the entire magnetic-induction flow meter.

An assembly process for an electrode anchor for a measuring electrode on a measuring tube of a magnetic-induction flow meter comprises the following steps:
  a) If necessary, attachment of flat surfaces on the external diameter on the measuring tube of the magnetic-induction flow meter;
  b) Fixing of a coupling fitting on the external diameter of the measuring tube, preferably while forming a groove together with the measuring tube;
  c) Insertion of a coupling insert into the coupling fitting orthogonally to the measuring tube.
  d) Rotating movement of the coupling insert, with the anchoring wings arranged on the coupling insert engaging in the groove or a groove arranged in the coupling fitting and wherein during the rotating movement a measuring electrode attachment partly arranged in the coupling insert, or a measuring electrode, is pressed against the coupling insert in a tight fit.

In the following, individual steps and further optional steps for the construction are explained in more detail:

The flat surfaces according to step a) may be obtained by filing or milling, for example.

The attachment of the coupling fitting according to step b) is preferably effected by welding it to a measuring tube. In this process, a groove is preferably formed. Alternatively, the coupling fitting itself may already have a groove.

The insert 10 may subsequently be inserted into the borehole of the measuring tube housing the measuring electrode—it may be molded in place, for example. The measuring electrode 7 is then pushed into this insert. The connection to the measuring electrode may also be effected by gluing or overmolding with sealing material.

The measuring electrode attachment 8 and the damping sleeve 13 may already be pre-installed in the coupling insert and be fixed with the fastening nut 14.

The coupling insert is then inserted into the coupling fitting. This is done by pushing it in.

Subsequent turning fixes the coupling insert inside the coupling fitting, with the L-shaped hooks of the coupling fitting reaching behind the coupling insert and thus fastening it to the measuring tube. At the moment of fastening, the contact between the measuring electrode attachment 8 and the measuring electrode 7 is made.

The invention claimed is:

1. A magnetic-induction flow meter especially for high pressure applications with medium pressures of more than 5.1 MPa (51 bar) with a measuring tube onto which an electrode anchor consisting of several parts for the purpose of fastening a measuring electrode is arranged, comprising the following components:
   a coupling fitting that is connected in same-substance manner with said measuring tube, with said coupling fitting having a groove or forming a groove together with said measuring tube; and
   a coupling insert to guide and/or fix said measuring electrode that is connected to said coupling fitting via a coupling, wherein:
   said coupling insert has anchoring wings that engage in said groove by means of a partial rotation and thus effect said coupling.

2. The magnetic-induction flow meter according to claim 1, wherein:
   said coupling insert has a recess running parallel to a measuring electrode axis, in which said measuring electrode and/or a measuring electrode attachment connected to it is arranged.

3. The magnetic-induction flow meter according to claim 1, wherein:
   one of: said measuring electrode and said measuring electrode attachment connected with said measuring electrode is connected by an insert against said coupling insert and is kept form-fitted as well as in a frictional connection in the process.

4. The magnetic-induction flow meter according to claim 1, wherein:
   the external diameter of said measuring tube has a flat surface in the area of said electrode anchor.

5. The magnetic-induction flow meter according to claim 3, wherein:
   said anchoring wings and said coupling fitting have surfaces placed on top of each other that have an inclination angle with regard to the flat surface of the external diameter of said measuring tube which is intended to determine the rotation direction of said coupling insert and said coupling fitting.

6. The magnetic-induction flow meter according to claim 1, wherein:
   said coupling fitting is welded to said measuring tube and preferably fastened with circumferential welding seams.

7. The magnetic-induction flow meter according to claim 1, wherein:
   said partial rotation of said coupling insert may be detached from said coupling fitting by partial rotation at an angle of 45-135°, preferably 60-120°, especially 80-100°.

8. The magnetic-induction flow meter according to claim 1, wherein:
   said coupling is marked by a form-fitted connection between said coupling insert and said coupling fitting.

9. The magnetic-induction flow meter according to claim 1, wherein:
   said coupling fitting is executed in the form of two L-shaped retaining brackets that reach behind said anchoring wings of said coupling insert.

10. The magnetic-induction flow meter according to claim 2, wherein:
    said recess of said coupling insert running parallel to said measuring electrode axis has a damping sleeve to limit the free movement of said measuring electrode and/or the measuring electrode attachment inside said recess and/or to electrically insulate said measuring electrode with regard to said coupling insert.

11. The magnetic-induction flow meter according to claim 3, wherein:
    said measuring electrode may in some sections be surrounded by saud insert made of a pressure-tight material arranged in a borehole in said measuring tube along the entire length of the borehole and having a sealing surface at the end, preferably as a projection on which said measuring electrode attachment is placed.

12. The magnetic-induction flow meter according to claim 11, wherein:
    said sealing surface has a material curvature pointing radially outwards.

13. The magnetic-induction flow meter according to claim 1, wherein:
    said measuring tube is at least partly covered inside with an electrically insulating material layer, with said measuring electrode punctuating this material layer and with the material layer having a material curvature in the direction of said measuring tube axis in the area of said measuring electrode.

14. An assembly process for an electrode anchor for a measuring electrode on a measuring tube of a magnetic-induction flow meter, comprising: a magnetic-induction flow meter especially for high pressure applications with medium pressures of more than 5.1 MPa (51 bar) with a measuring tube onto which an electrode anchor consisting of several parts for the purpose of fastening a measuring electrode is arranged, comprising the following components: a coupling fitting that is connected in same-substance manner with said measuring tube, with said coupling fitting having a groove or forming a groove together with said measuring tube; and a coupling insert to guide and/or fix said measuring electrode that is connected to said coupling fitting via a coupling, wherein: said coupling insert has anchoring wings that engage in said groove by means of a partial rotation and thus effect said coupling, the method comprising the following steps:
    a) if necessary, attachment of flat surfaces on the external diameter on the measuring tube of the magnetic-induction flow meter;
    b) fixing of a coupling fitting on the external diameter of the measuring tube, preferably while forming a groove together with the measuring tube;
    c) insertion of a coupling insert into the coupling fitting orthogonally to the measuring tube; and
    d) rotating movement of the coupling insert, with the anchoring wings arranged on the coupling insert engaging in the groove or a groove arranged in the coupling fitting, wherein:
    during the rotating movement a measuring electrode attachment partly arranged in the coupling insert, or a measuring electrode, is pressed against the coupling insert in a tight fit.

* * * * *